ional Patent

United States Patent [19]

Simms et al.

[11] Patent Number: 5,036,754
[45] Date of Patent: Aug. 6, 1991

[54] AUTOTRACKING FUME EXTRACTION EXHAUST HOOD

[75] Inventors: Marvin Simms; Mario Santoianni; Jeffrey Marcus; Kenneth Unger, all of Montreal, Canada

[73] Assignee: Diversitech Equipment & Sales (1984) Ltd., Ville Mont Royal, Canada

[21] Appl. No.: 600,705

[22] Filed: Oct. 22, 1990

[51] Int. Cl.$^5$ .............................................. B05B 15/00
[52] U.S. Cl. .................................................. 98/115.4
[58] Field of Search ........................... 98/115.1, 115.4; 219/136, 137.41

[56] References Cited

U.S. PATENT DOCUMENTS

| 4,058,299 | 11/1977 | Lindkvist ...................... 98/115.4 X |
| 4,163,650 | 8/1979 | Watson et al. ................. 98/115.4 X |
| 4,287,405 | 9/1981 | Ohmae et al. ................. 98/115.4 X |
| 4,724,751 | 2/1988 | Jentuch et al. ..................... 98/115.4 |

FOREIGN PATENT DOCUMENTS

| 78198 | 5/1985 | Japan . |
| 1546067 | 5/1979 | United Kingdom . |

Primary Examiner—Harold Joyce
Attorney, Agent, or Firm—Donald E. Hewson

[57] ABSTRACT

An exhaust system for fume extraction from a work area such as the vicinity of a welding gun is provided, having an articulted exhaust duct with a fume hood mounted at the forward end thereof. A signal emitter is mounted on the work tool, and three sensors are mounted on the fume hood, one at the front and one at each side so as to form a triangle. One motor is provided at the joint between the front and rear portions of the articulated exhaust duct, and two further motors are provided at the rear end of the exhaust duct. The first motor opens and closes the angle between the front and rear portions of the exhaust duct, and the second motor moves the rear portion of the exhaust duct backward and forward in the same vertical plane as that in which the front and rear portions of the exhaust duct move under the influence of the first motor. The third motor turns the entire assembly in an arc. The sensors are set up through signal conversion circuit means to develop triangulation error signals, whereby relative motion of the emitter with respect to the sensors, and the direction of that motion, can be determined. The signal conversion circuit provides signals to drive any or any combination of the motors, to an amount necessary and in the direction necessary to neutralize the triangulation error signals and therefore to move the fume hood closer to the work tool.

7 Claims, 3 Drawing Sheets

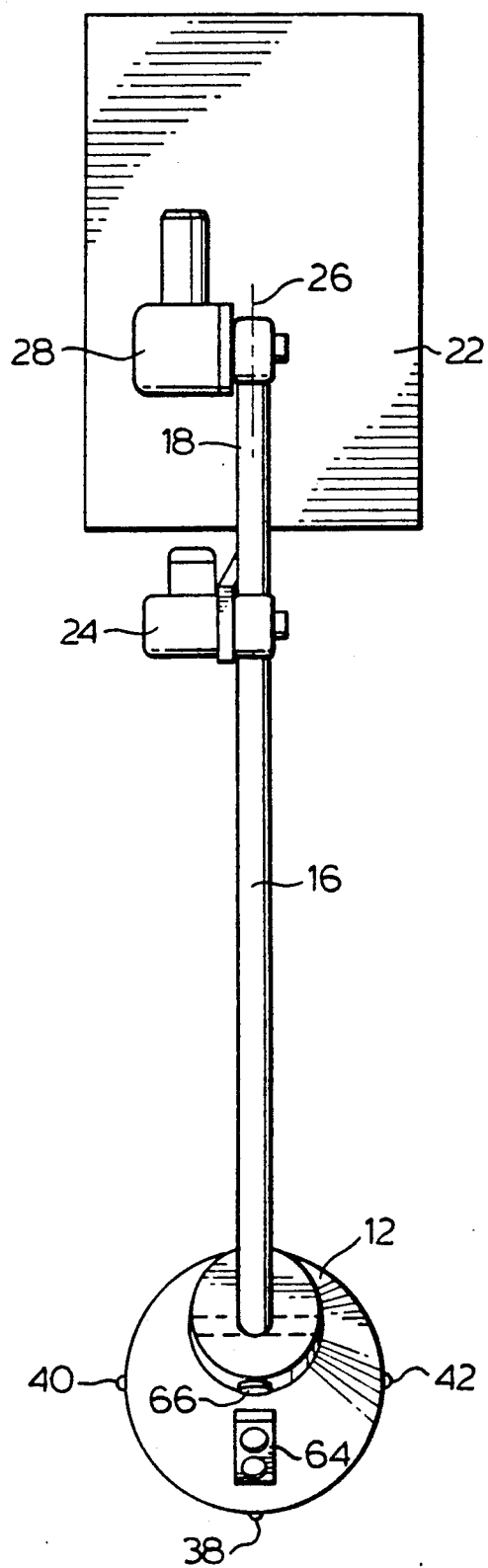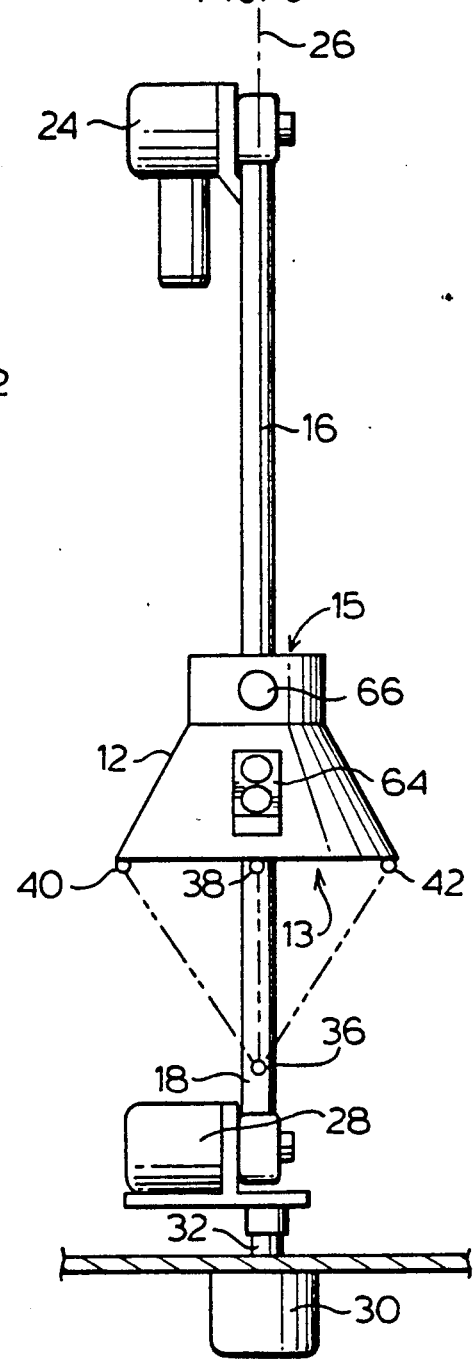

AUTOTRACKING FUME EXTRACTION EXHAUST HOOD

FIELD OF THE INVENTION

This invention relates to exhaust systems of the sort particularly used in work places such as welding shops and the like. The present invention provides an exhaust system that automatically tracks the source of the fumes to be exhausted; and since the source of the fumes to be exhausted is a work tool such as a hand held welding gun working against a workpiece, the prevent invention provides a system whereby the fume hood is always placed as close as necessary and practicable to the source of the fumes.

BACKGROUND OF THE INVENTION

In work shops where heavy industrial manufacturing processes such as welding are carried out, there may be significant quantities of fumes, gases, vapours or other contaminants being produced which must be exhausted away from the work area. The present invention is not directed to systems for scrubbing or neutralizing the fumes or other noxious gases, but it is directed to a system whereby as much as is possible capture of the fumes being generated is accomplished.

Generally, exhaust systems may comprise an exhaust duct which may be articulated having two or three sections, or it may be flexible and suspended from an articulated support frame. In either event, a fume hood is provided at the forward end of the exhaust duct and a fan is provided at the rear end of the exhaust duct. When the fan is operated, a vacuum is created in the area of the fume hood, so as to extract the fumes being generated in the area of the fume hood and below it.

Whether the fan, and thereby the rear end of the exhaust duct, is mounted on a moveable cart or is fixed, is immaterial to the present invention. What is important is that the fume extraction system provided by the present invention may be placed in any convenient place near the work tool, or vice versa, so as to accomplish fume extraction.

Generally, it is best to effect fume or contaminant extraction from near the source of the contaminant. The contaminants may be simply gasses, they may include dust particles and other small particles such as weld splatter or paint droplets, and so on. The use of local fume extraction is particularly attractive when the alternatives are considered; they may include high volume fresh air circulation where gross exchange of air volume is effected, or other updraft or exhaust systems which may be particularly useful in spray paint booths and the like, but not at all useful in environments such as a welding shop. Moreover, in any work place having a large floor area and/or a high work area, the cost of gross air exchange is prohibitive. Still further, cross drafts may be created, which in some instances may result in the contaminants generated in the work area being blown directly at the workers in the area.

There have been developed remote exhaust arms that may be positioned over the source of the contaminants; and several such systems are discussed below. One of the concerns in general with the prior art systems has been that every time the work tool or workpiece is moved beyond the effective range of the fume hood, the fume hood or the workpiece must be re-positioned. While this may be acceptable for certain kinds of static work, it is clearly not acceptable for work such as welding where the tool may be moved within a limited range but beyond the effective range of the fume hood. Any requirement for the work tool and the workpiece to be moved to accommodate the limitations of contaminant extraction reduces the efficiency of the work being done, or the efficiency of the worker, and is therefore unacceptable.

The present invention recognizes that a reasonably large area can be defined (limited only by the specific dimensions of the apparatus provided by this invention), whereby any work being done within that prescribed area can be automatically tracked by the exhaust system so that the fume hood is always located in a position relative to the work in order that the maximum fume extraction that can be accomplished is achieved. By the present invention, an autotracking fume extraction exhaust hood is provided that does not require any manual re-positioning of the hood or the work tool within the working area prescribed for the apparatus, thereby significantly improving the efficiency of the work and of the worker. This is particularly effective in the circumstances where the worker is using a hand held tool, such as is most common in a welding operation.

DISCUSSION OF THE PRIOR ART

A typical exhaust system having a flexible exhaust duct suspended from or supported by a moveable and articulated frame is taught in Nederman Canadian Patent No. 973,012 issued Aug. 19, 1975.

A more sophisticated apparatus which provides for fume extraction to be used in association with flame cutting apparatus is taught in Lindkvist Canadian Patent No. 1,062,533 issued Sept. 18, 1979. That patent teaches a device which uses sensing means to relocate a suction box with respect to the cutting assembly. However, the apparatus also requires that the cutting jets be slowed down in certain cases.

Marshall British Patent No. 1,546,067 published May 16, 1979, very broadly teaches an apparatus having a flexible pipe connected to a fume hood on which a pair of sensors are located. Generally, the sensors are photocells which detect a welding arc, and as the welding arc moves towards or away from either of the sensors it causes the arm to be re-positioned. Systems that require the use of photocells may, however, be sensitive to the presence of smoke which might cause false signals to occur.

Ohmae et al in U.S. Pat. No. 4,287,405 also require a photoelectric device which re-positions and controls the travel of a suction hood along a linear weld line. There is no contemplation by Ohmae et al of other than essentially linear movement of the fume hood to be effected.

Finally, Takamaru et al, in Japanese Patent No. 60-78198 published May 2, 1985 shows a fume extraction device that requires the use of four photoelectric sensors.

SUMMARY OF THE PRESENT INVENTION

The present invention overcomes either the essentially crude operation of some of the prior art devices described above, or the essentially high capital costs of others of the prior art devices described above; and in all events, the present invention is particularly directed to an apparatus which, especially in its preferred embodiments, overcomes the shortcomings of optical circuits whose operation may be materially effected by the presence of visually evident contaminants such as smoke.

What the present invention provides is an exhaust system that has a fume hood mounted at the forward end of an exhaust duct, and in gas communication therewith. Blower means are provided at the end of the exhaust duct remote from the fume hood, so that when the blower means is operating a vacuum is created in the region of the fume hood.

The exhaust duct is arranged to be articulated in two portions of substantially equal length, the front portion terminating at its forward end at the fume hood, and the rear portion terminating at its rearward end at the blower.

Three motors are provided, with a first motor located at the junction between the forward and rear portions of the exhaust duct so as to open and close the angle that it subtends between the front and rear portions of the exhaust duct; the second motor being mounted at the base of the rear portion of the exhaust duct to tilt it backwards and forwards; and the third motor being also mounted at the base of the rear portion of the exhaust duct so as to move the exhaust duct in an arc. The mounting of the first and second motors is such that the front and rear portions of the exhaust duct move in a vertical plane.

A signal emitter is provided on the work tool, and three signal receiving sensors are mounted on the fume hood, with the first sensor mounted essentially in the vertical plane in which the forward and rearward motion of the exhaust duct is effected. The second and third sensors are mounted at each side of the fume hood. The sensors are thereby mounted so as to form a triangle.

Finally, signal conversion circuit means are provided with the sensors to receive signals therefrom and to develop triangulation error signals, so that the relative position of the triangle to the signal emitter on the work tool may be determined. Drive signal means are associated with the signal conversion circuit to drive any of the first, second and third motors in response to the triangulation error signals so as to re-position the fume hood to a pre-determined position with respect to the signal emitter which is mounted on the work tool. By so doing, the fume hood is positioned to a pre-determined effective position relative to the source of fumes which are to be extracted.

BRIEF DESCRIPTION OF THE DRAWINGS

These and other features of the present invention are discussed in greater detail hereafter, in association with the accompanying drawings, in which:

FIG. 2 is a notional top view of an apparatus in keeping with the present invention;

FIG. 3 is a notional front view of an apparatus in keeping with the present invention.

DESCRIPTION OF THE PREFERRED EMBODIMENTS

Figure 1:
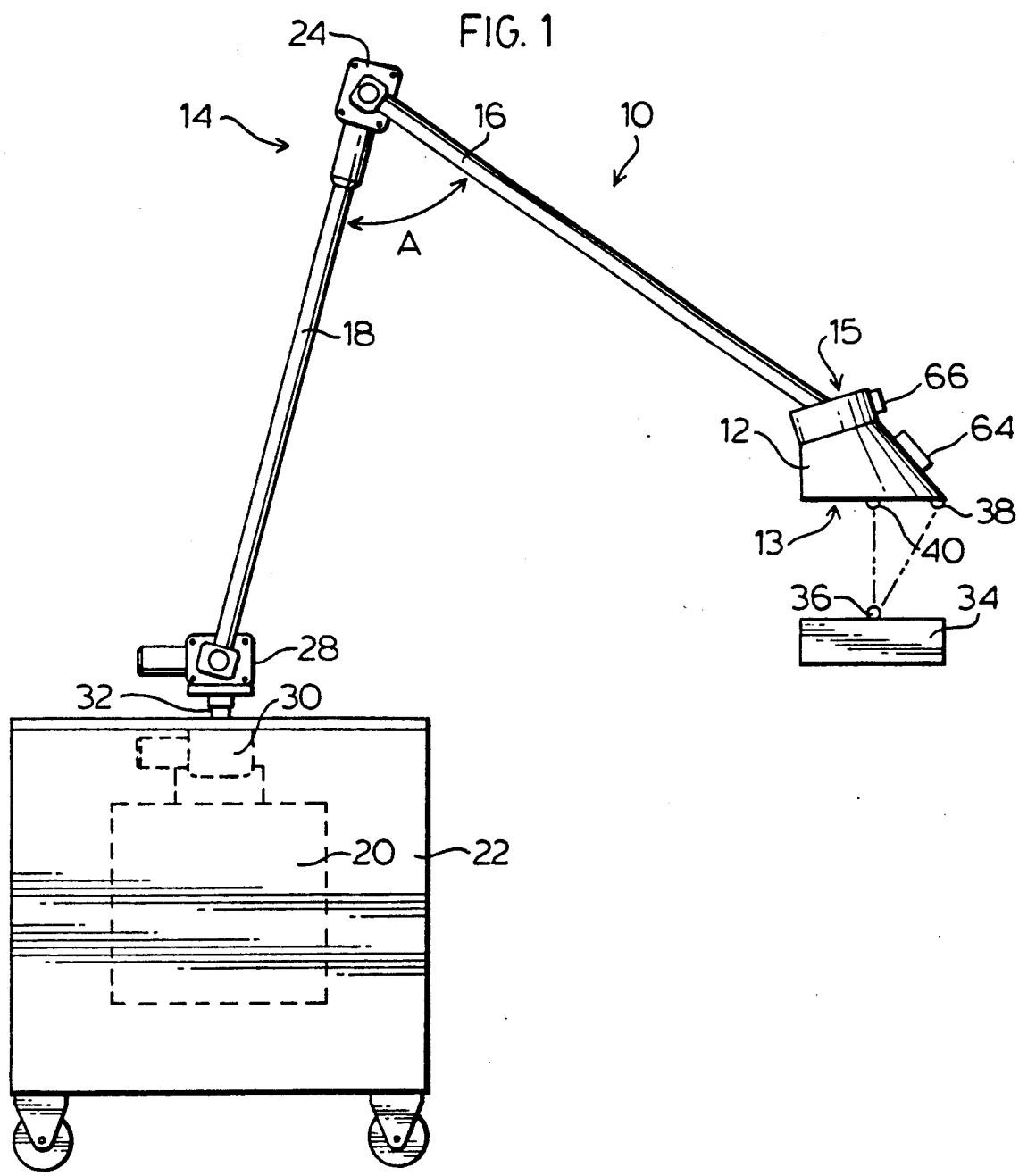
FIG. 1 is a notional side view of an apparatus in keeping with the present invention.

In the following discussion the same reference numeral is used to specify identical components in each of the Figures, as appropriate.

Referring to FIG. 1, the apparatus shown generally at 10 has a fume hood 12, an exhaust duct 14 having a front portion 16 and a rear portion 18, and a blower 20 at the rearward end of the exhaust duct 14. In the embodiment shown the blower 20 is located in a wield cart 22, but it is important only that the exhaust from the blower 20 is conducted elsewhere for further handling or scrubbing, or discharge into the atmosphere.

The fume hood 12 is generally in the form of a truncated cone, having a wide mouth 13 and a narrow top 15. The fume hood 13 is, of course, in gas communication with the exhaust duct 14.

It will be noted that the exhaust duct 14 is articulated, and that each of the front portion 16 and the rear portion 18 are of substantially equal length. A motor 24 is located at the junction formed by the forward end of the rear portion 18 and the rear end of the front portion 16 of the exhaust duct. As seen best in FIGS. 2 and 3, the motor 24 is arranged so as to open and close the angle designated at A in FIG. 1 between the front portion 16 and rear portion 18 of the exhaust duct 14 in a vertical plane. For ease of reference, the plane is indicated at 26 in FIGS. 2 and 3.

It will be clear that as the angle A opens and closes, the front and rear portion 16 and 18 of the exhaust duct 14 essentially sweep in the vertical plane 26. As a matter of geometry, the angle A may be as little as about 5 degrees, and it may extend to as much as 180 degrees—at which point the exhaust duct 14 would be essentially straight.

Two further motors 28 and 30 are mounted at the rearward end of the rear portion 18 of the exhaust duct 14. The motor 28 is arranged to move the rear portion 18 of the exhaust duct 14 in the same vertical plane 26 discussed above. The motor 28 is generally arranged to move the rear portion 18 from being substantially vertical to being substantially horizontal.

The motor 30 is arranged so as to move or swing the vertical plane 26 in an arc about a centre which is substantially at the rearward end of the rear portion 18 of the exhaust duct 14, being the axis of the post 32 on which the exhaust assembly is mounted.

The work tool, which may be such as a hand held welding gun, is indicated generally at 34 in FIG. 1. Mounted on the work tool 34 is a signal emitter which is indicated at 36. Three signal receiving sensors are mounted near the open mouth 13 of the fume hood 12, and they are shown generally at 38, 40, and 42.

It will be clear, especially from FIG. 2, that the sensors 38, 40 and 42 are mounted so as to form a triangle. It will also be noted that the sensors will form a prescribed three dimensional four-sided Figure with respect to the emitter 36, the precise purpose of which is discussed below.

It is the purpose of the present invention to provide a signal conversion circuit means by which signals from the sensors 38, 40 and 42—which are contingent on signals received by those sensors from the emitter 34—will develop triangulation error signals so that the relative position of the triangle formed by the sensors 38, 40 and 42 with respect to the signal emitter 34 may be determined. Associated with that are drive signal means which may be generally considered at 44, 46, 48, 50, 52, 54, 56, 58, 60 and 62, in FIG. 4. The details of that circuit are discussed below; but it is clear that signals are developed to drive any of the motors 24, 28 and 30 in response to the triangulation error signals so as to re-position the fume hood 12 in order to maintain the fixed spatial relationship of the sensors 37, 40 and 42 with the signal emitter 36.

Referring again to the function of the motors, it will be seen that motor 24 essentially permits a pitch motion of the forward portion 16 of the exhaust duct 14. Likewise, the function of the motor 28 is to provide a pitch motion to the rear portion 18 of the exhaust duct 14. By combining the operations of the motor 24 and 28, net forward and rearward motion of the fume hood 12 can be achieved.

Likewise, sideways motion is achieved by the operation of the motor 30, which moves the exhaust duct 14 in an arc around the axis of the post 32. Thus, by controlling operation of all three motors, the position of the fume hood 12 within a designated area can be accomplished, and vertical positioning can be effected.

In a general sense, the magnitude of the signal sent out by each of the sensors 38, 40 and 42 to the signal conversion circuit is directly proportional to the magnitude of the signal received at each of those sensors from the emitter 36. Obviously, if the emitter 36 is moved with respect to its spatial positioning relative to the sensors, a triangulation error can be produced to control the operation of the motors 24, 28 and 30.

The emitter 34 may be an infrared emitter, and each of the sensors may be adapted to sense the presence and amplitude of a signal coming from it. However, as noted above, it there is the likelihood of smoke to be developed during the work operation being carried on, then there is the possibility of a chance that erroneous signals may be detected.

The preferred embodiment of the present invention contemplates that the emitter 34 is an ultrasonic emitter, working in a pulsed mode as described hereafter. Once again, the specific operating characteristics of the emitter 34 and of the sensors are not material to the present invention, except it is worthy to note that by using an ultrasonic emitter the likelihood for error due to the presence of the contaminants to be exhausted is considerably reduced. Moreover, because of the ultrasonic operation of the preferred embodiment of the present invention, easy calibration and control may be derived because the specific operation is determined as a consequence of the speed of sound, which would not vary in the presence of the contaminants generally to be exhausted from the work area by the exhaust system of the present invention.

Figure 4:
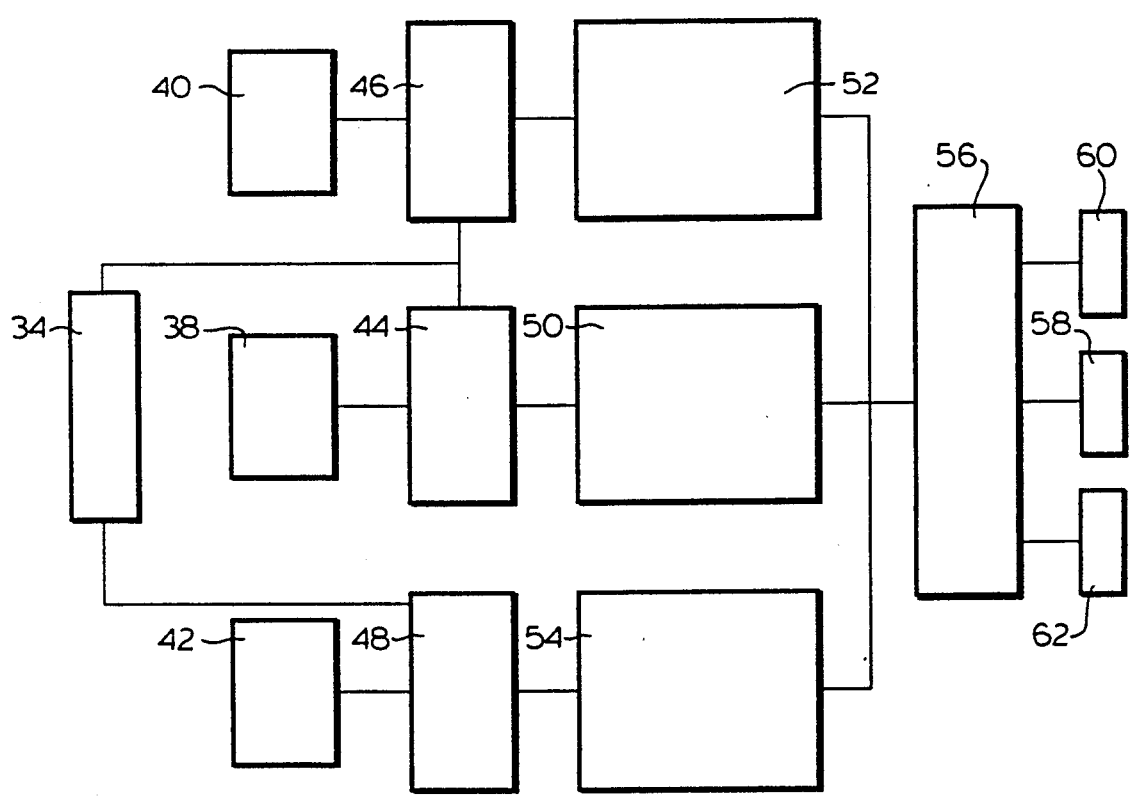
FIG. 4 is a block diagram showing a typical signal handling circuit whereby the apparatus of FIGS. 1 to 3 operates.

Referring specifically to FIG. 4, when the emitter 34 emits a pulse of its ultrasonic signal, at the same time it emits a time pulse which is transmitted by wire as shown in FIG. 4 to converters 44, 46 and 48. Thus, at the time that the emitter 34 transmits a pulse of ultrasonic frequency signal, the time pulse that it transmits is received simultaneously by each of the elements 44, 46 and 48 which are time to distance converters. A short time later, the ultrasonic signal from the emitter 34 is received at the sensors 38, 40 and 42; but if the emitter has moved with respect to its previous position relative to the sensors, then one or the other of the sensors will receive the signal later than the other sensor or sensors. In that way, it can be determined that the emitter 34 has moved, and it can be determined in which direction it has moved. The distance of the emitter to each sensor is a product of the speed of sound and the time in which it takes for that sound to be transmitted from the emitter and received by the sensor. Thus, if it is known when the ultransonic pulse is transmitted by virture of the essentially instantaneous transmission of an electronic pulse to the time to distance converters, then the length of time that it takes the pulse to reach each of the sensors 38, 40 and 42 can be determined. It is then a simple conversion to determine the distance (or the relative distance) of the emitter to each of the sensors.

Each of the time to distance converters may then transmit a signal to further signal handling devices 50, 52 and 54, which may conveniently be binary counters and digital to analog converters so as to develop and transmit a triangulation error signal to the triangulation conversion matrix controller 56. That controller 56, in turn, controls the motor controllers 58, 60 and 62 which control the operation of each of the motors 24, 28 and 30. The sense of the relative motion of the emitter 34 relative to the fume hood 12 can be determined from the triangulation conversion matrix 56, so that any of the motors may be driven in a forward or rearward direction; it being understood that the motors are generally DC motors that are conveniently step motors.

The initial set up of the fume hood 12 relative to the work tool 34 can be conveniently accommodated by providing override switches for each of the motors on the fume hood as shown at 64. Thus, an operator may manipulate the fume hood 12 to a desired position by operating the override switches mounted at 64 to control each of the moulders to precisely position the fume hood. At that time, a calibration or reference signal may be set in the triangulation conversion matrix 56, whereby the relative position of the emitter 36 to the sensors 38, 40 and 42 is predetermined.

For the purposes of safety, a stop button 66 may be mounted on the fume hood 12.

Moreover, each of the motors 24, 28 and 30 may be fitted with a slip clutch which has a predetermined slip force at which it becomes effective. Thus, if the fume hood, or the front portion 16 or rear portion 18 of the exhaust duct 14, should encounter any obstacle, the slip clutch will become effective and preclude further driving operation of the exhaust duct and fume hood—thereby precluding the likelihood of injury or damage.

There has been described an autotracking fume extraction exhaust hood. The general principals of the operation of the apparatus according to the present invention have been discussed, and it is clear that the specific physical embodiments may be derived as required without departing from the spirit and scope of the appended claims.

We claim:

1. An exhaust system for fume extraction from a work area in the immediate vicinity of a work tool when operating on a workpiece, comprising:

a fume hood in the form of a truncated cone having a wide mouth and a narrow top;

an exhaust duct in gas communication with said fume hood;

blower means at the end of said exhaust duct remote from said fume hood, said blower means being adapted to create a vacuum in the region of the wide mouth of said fume hood when said blower means is operating;

said exhaust duct being in two portions of substantially equal length, said two portions being a front portion and a rear portion, said two portions being pivotally connected at the junction formed by the forward end of said rear portion of said exhaust duct and the rearward end of said front portion of said exhaust duct, said exhaust duct having said front portion terminating at its forward end at said fume hood and said rear portion pivotally terminating at its rearward end at said blower means;

a first motor located at the junction to open and close the angle that said exhaust duct subtends essentially in a vertical plane swept by both of said rear and front portions of said exhaust duct, and said angle may be in the range of from about 5 degrees to about 180 degrees;

a second motor and a third motor mounted at the rearward end of said rear portion of said exhaust duct;

wherein said second motor moves said rear portion of said exhaust duct in said vertical plane from being substantially vertical to being substantially horizontal;

wherein said third motor is arranged so as to move said vertical plane of said exhaust duct in an arc about a centre substantially at said rearward end of said rear portion;

a signal emitter on said work tool;

three signal receiving sensors mounted near said open mouth of said fume hood;

wherein the first of said three sensors is mounted at the front of said fume hood substantially in said vertical plane; and wherein the second and third of said three sensors are mounted at each side of said fume hood so as to form a triangle with said first sensor;

signal conversion circuit means arranged with said sensors to receive signals therefrom and to develop triangulation error signals, whereby the relative position of said triangle to said signal emitter is determined;

and drive signal means associated with said signal conversion circuit means to drive any of said first, second and third motors in response to said triangulation error signals so as to re-position said fume hood to a predetermined position with respect to said signal emitter.

2. The exhaust system of claim 1, wherein the magnitude of the signal sent by each of said sensors to said signal conversion circuit is directly proportional to the magnitude of the signal received at each sensor from said emitter, and said signal conversion circuit comprises means to determine the magnitude of the signals received by it from each sensor; and wherein said triangulation error signals are the product of the relative magnitude of said signals received from said sensors;

whereby each of said first, second and third motors is driven by said drive signal means in response to said triangulation error signals.

3. The exhaust system of claim 1, wherein said emitter is an infrared emitter, and each of said sensors is adapted to sense the presence and amplitude of a signal from said infrared emitter.

4. The exhaust system of claim 1, wherein said emitter is an ultrasonic emitter, and each of said sensors is adapted to sense the presence of a signal from said ultrasonic emitter.

5. The exhaust system of claim 4, wherein said triangulation error signals are determined by a measurement of the time lapse between an electronic timing pulse and an ultrasonic pulse received at each of said sensors from said emitter, where the sensors receive the timing pulse simultaneously.

6. The exhaust system of claim 5, wherein each of said first, second, and third motors is fitted with a slip clutch having a predetermined slip force at which it becomes effective in the event that an obstacle is encountered by any of said fume hood, or said front or rear portions of said exhaust duct.

7. The exhaust system of claim 1, wherein each of said first, second, and third motor has override switches located at said fume hood, so that said fume hood may be initially positioned by operating said override switches.

* * * * *

UNITED STATES PATENT AND TRADEMARK OFFICE
CERTIFICATE OF CORRECTION

PATENT NO. : 5,036,754

DATED : August 6, 1991

INVENTOR(S) : Marvin Simms, et al

It is certified that error appears in the above-identified patent and that said Letters Patent is hereby corrected as shown below:

On the title page, item [30] should read:

-- Canada      2,014,734-2      04/17/1990

Signed and Sealed this

Seventh Day of July, 1992

Attest:

DOUGLAS B. COMER

Attesting Officer     Acting Commissioner of Patents and Trademarks